Sept. 15, 1925.

W. R. EDWARDS ET AL 1,553,602

MACHINE FOR BORING WHEELS AND RIMS

Filed Sept. 18, 1919  4 Sheets-Sheet 1

Sept. 15, 1925.
W. R. EDWARDS ET AL
1,553,602
MACHINE FOR BORING WHEELS AND RIMS
Filed Sept. 18, 1919   4 Sheets-Sheet 3

Inventor
W. R. Edwards.
H. W. Kranz.
By
Hull Smith Brock & West
Attys

Sept. 15, 1925.  
W. R. EDWARDS ET AL  
1,553,602  
MACHINE FOR BORING WHEELS AND RIMS  
Filed Sept. 18, 1919   4 Sheets-Sheet 4

Inventor
W. R. Edwards.
H. W. Kranz.
By Hull Smith Brock & West
Attys.

Patented Sept. 15, 1925.

1,553,602

UNITED STATES PATENT OFFICE.

WILLIAM R. EDWARDS AND HARRY W. KRANZ, OF CLEVELAND, OHIO, ASSIGNORS TO THE HYDRAULIC PRESSED STEEL COMPANY, OF CLEVELAND, OHIO, A CORPORATION OF OHIO.

MACHINE FOR BORING WHEELS AND RIMS.

Application filed September 18, 1919. Serial No. 324,503.

*To all whom it may concern:*

Be it known that we, WILLIAM R. EDWARDS and HARRY W. KRANZ, citizens of the United States, residing at Cleveland, in the county of Cuyahoga and State of Ohio, have invented a certain new and useful Improvement in Machines for Boring Wheels and Rims, of which the following is a full, clear, and exact description, reference being had to the accompanying drawings.

This invention relates generally to a drilling and boring machine and more particularly to one intended for use in connection with the manufacture of wheels.

At the present time, there is one type of automobile wheels comprising wooden spokes and a flanged metallic felly band or rim which is secured to the wooden spokes by means of transverse bolts or rivets; and this machine is designed for the purpose of applying the flanged sheet metal felly band to the wooden spider and simultaneously boring all the transverse openings through the spoke ends and the felly band, preparatory to receiving the fastening bolts or rivets.

It will be understood however that the invention can also be utilized for other purposes than the specific one hereinbefore mentioned.

The object of the invention is to provide a simple and efficient machine which can be operated by fluid pressure, so far as the relative movements of the various parts are concerned, and another object is to provide a device in which the wooden spider can be properly positioned upon a bed plate and the felly band arranged thereon and the machine then set in operation to first force the felly band firmly upon the spoke ends and then carry the wheel body thus assembled down upon the rotating drills for the purpose of boring the transverse holes through the spoke ends and felly band.

With these, and certain other objects in view, which will become apparent as the description proceeds, the invention consists in the novel features of construction hereinafter fully described and pointed out in the claims.

Figure 1:
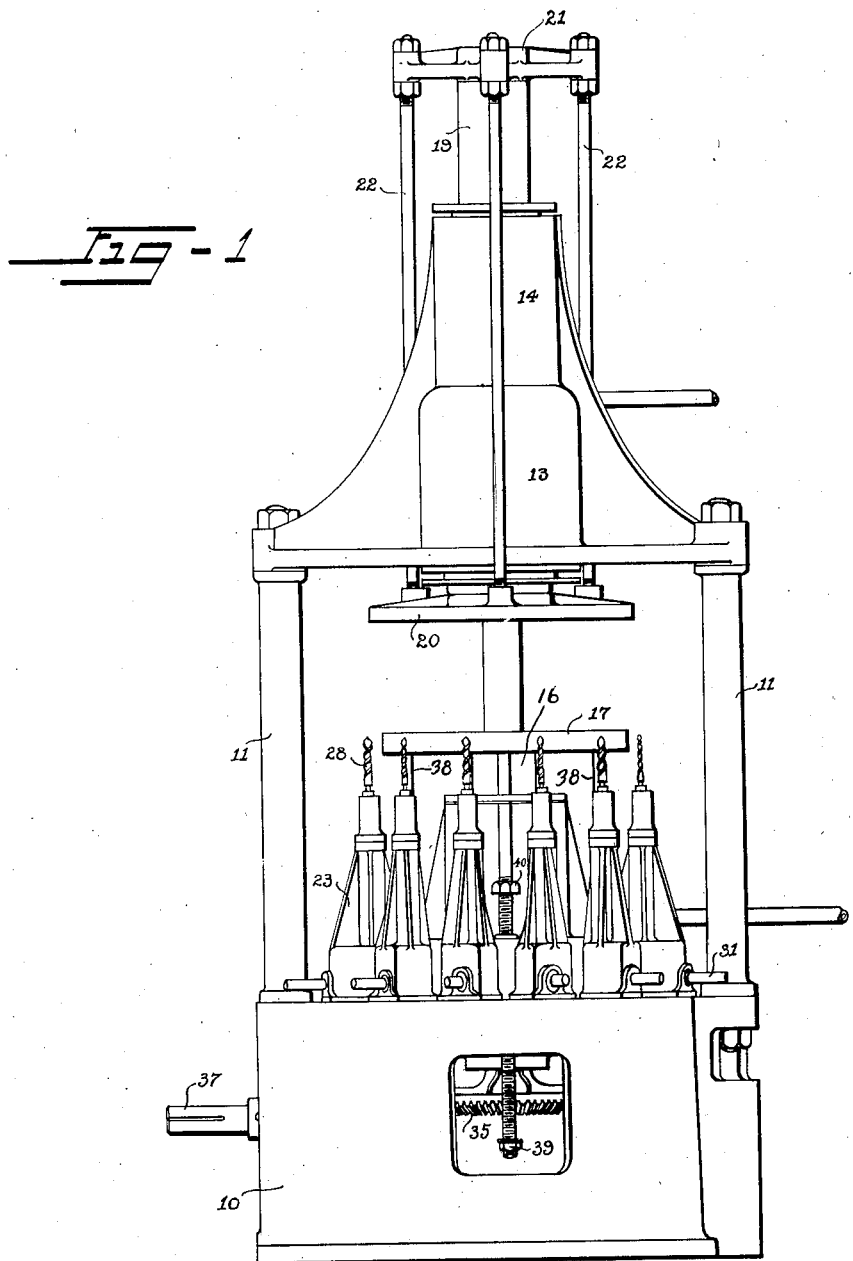
Figure 2:
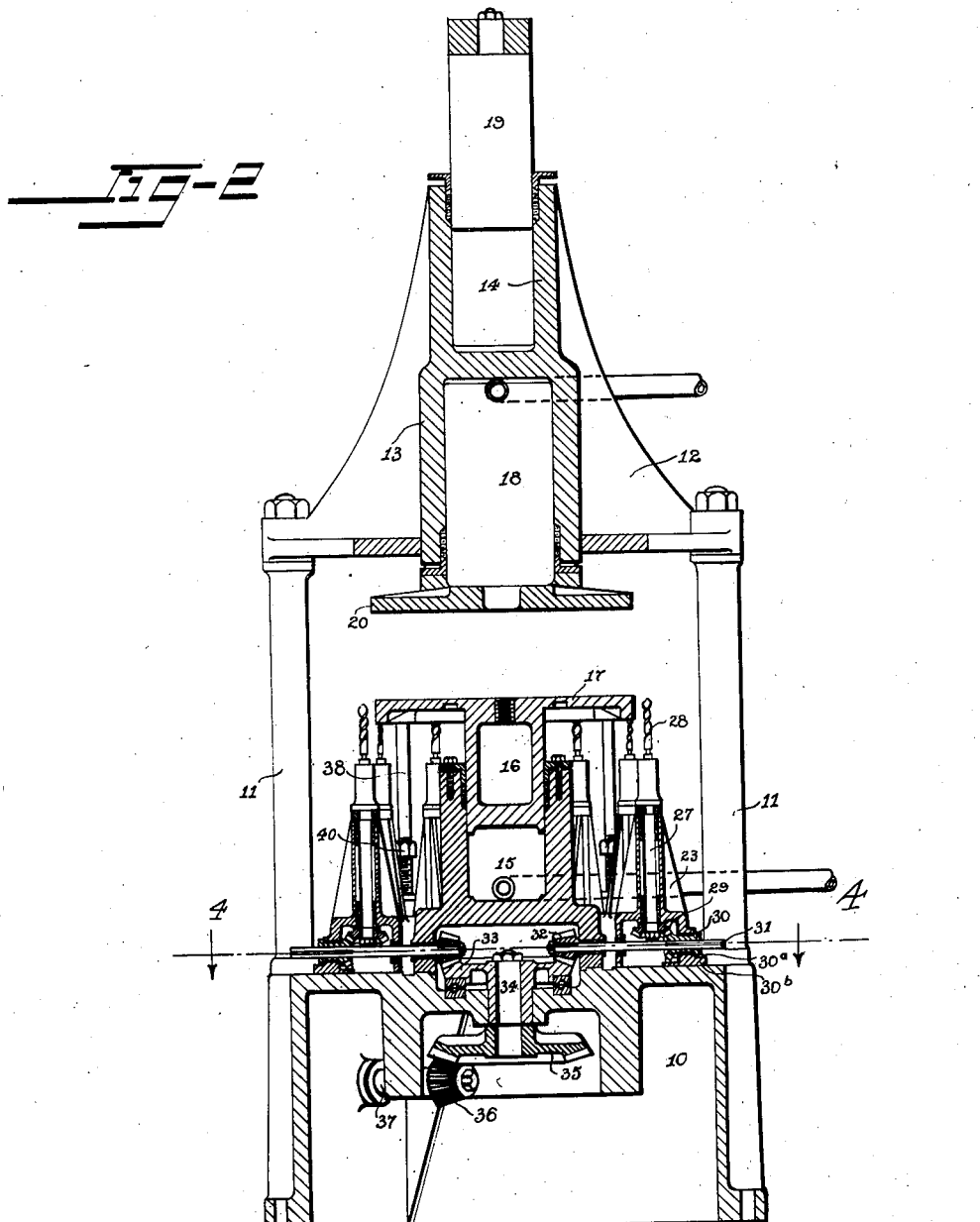
Figure 3:
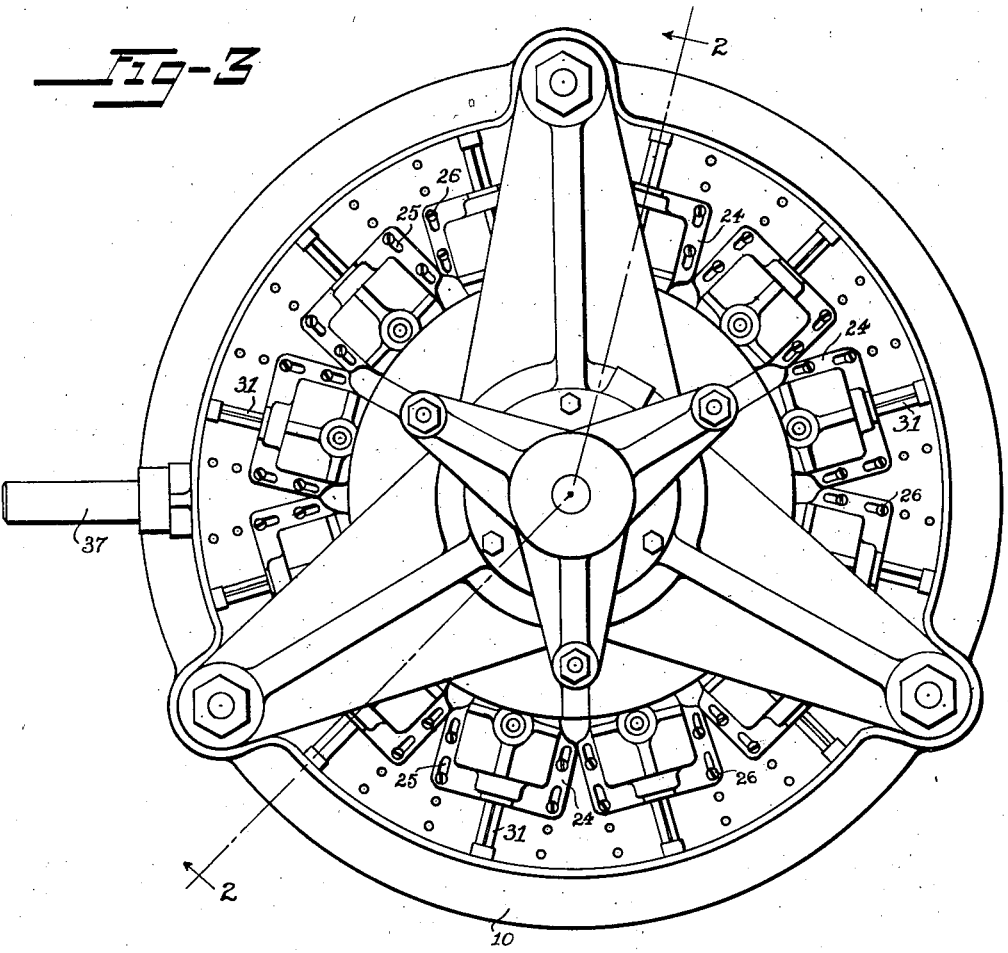
Figure 4:
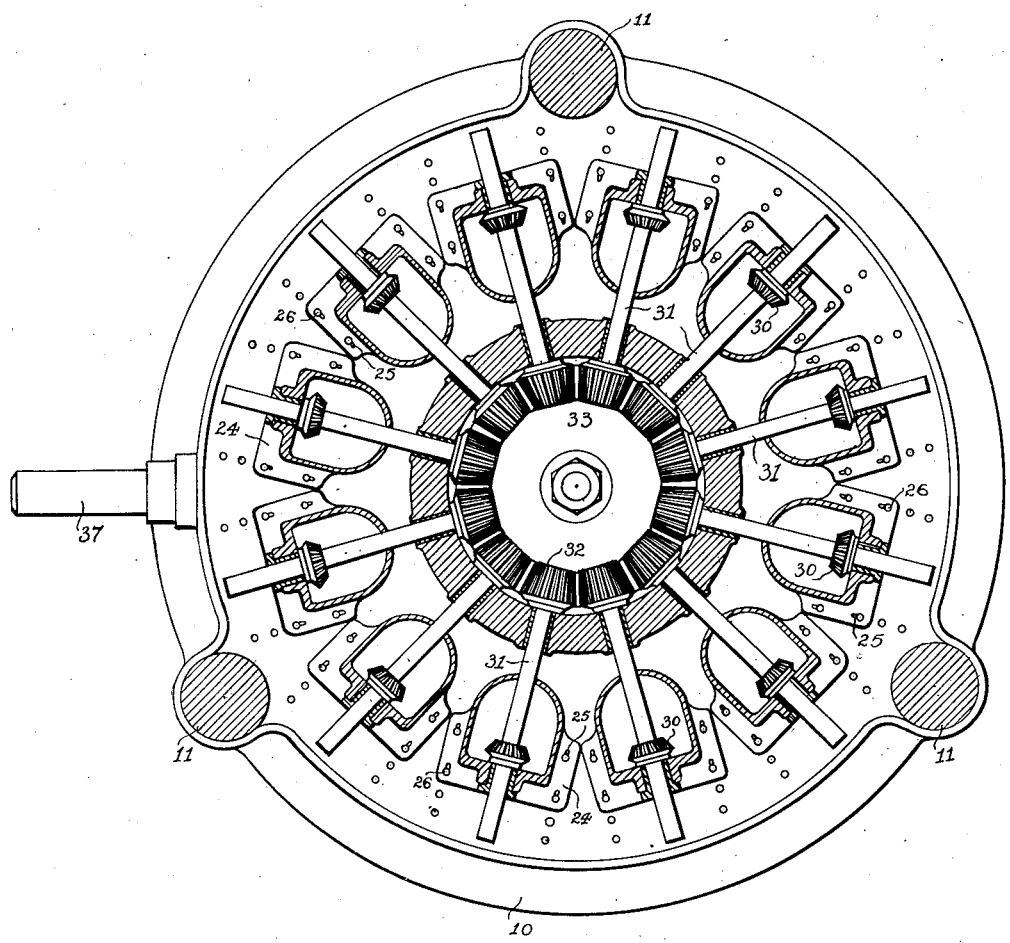

In the drawings forming a part of this specification Fig. 1 is a side elevation of a machine constructed in accordance with our invention; Fig. 2 is a vertical sectional view of the same taken on the line 2—2 of Fig. 3; Fig. 3 is a top plan view and Fig. 4 is a horizontal sectional view on the line 4—4 of Fig. 2.

In the practical embodiment of the invention we employ a metal base 10 to which are rigidly secured a plurality of standards 11, three such standards or uprights being shown in the drawing, but it will of course be understood that any desired number may be employed.

The base is preferably circular in form, and supported upon the upper ends of the standards 11, is a cylinder casting 12 comprising the lower cylinder 13, and upper cylinder 14, and the integral yoke members which are securely bolted to the upper ends of the standards and maintain the cylinder casting in its proper position.

The bed plate cylinder 15 is arranged centrally upon the base 10 and working in this cylinder is a piston 16, which is integral with the bed plate 17, said bed plate being of a definite diameter according to the size of the wheel or other circular object to be operated upon and it is obvious that for different sizes of aritcles different sizes of bed plates might be employed or other adjustments may be had as will be more fully explained hereafter.

Fluid pressure is supplied to the bed plate cylinder 13 for the purpose of raising the bed plate or table and suitable packings and glands are of course employed to prevent leakage.

A piston 18 works in the cylinder 13 and a drill plate 20 is rigidly attached to the lower end of this piston 18, and a yoke or spider 21 is securely attached to the upper end of the piston 19, and the drill plate 20 and yoke or spider 21 are rigidly connected together by means of rods 22, there being three such rods shown, but any desired number may be employed.

Fluid pressure is applied to the cylinders 13 and 14, and it will be noted that the diameter of the cylinder 13 is considerably greater than the diameter of the cylinder 14, and also considerably greater than the diameter of the bed plate cylinder 15, the purpose of such differences being more fully explained hereinafter.

Mounted also upon the base 10, and surrounding the bed plate cylinder, and concentric therewith, are a series of drill columns 23, these drill columns having base flanges 24 provided with elongated slots 25 through which fastening bolts 26 are passed in to the base 10, there slotted base flanges permitting the drill columns to be moved radially inwardly or outwardly to accommodate wheels of different sizes.

In each drill column there is mounted a spindle 27 carrying a drill 28 at its upper end and a beveled gear 29 at its lower end, said beveled gear meshing with a similar gear 30, mounted upon a shaft 31, passing horizontally through the lower portion of the drill column, the outer end of the shaft 31 being splined or grooved so as to permit the longitudinal adjustment of the drill column and with the beveled gear 30, said beveled gear being formed with a sleeve 30$^a$ which is mounted in the drill column housing and the removable bearing block 30$^b$. The inner end of the shaft 31 passes through the drill column housing and also through the annular portion of the bed plate cylinder casting and at its inner end is provided with a beveled gear 32, which meshes with a beveled ring gear 33, which is rigidly connected to a short vertical shaft 34 which carries a bevel ring gear 35 at its lower end which meshes with the beveled power gear 36 mounted upon the inner end of the main or power shaft 37. Between the ring gear 33 and the base 10 there is interposed a thrust bearing composed of anti-friction balls and a pair of mating grooved rings adapted to receive said anti-friction balls; the base 10 being provided with a circular groove to receive one of the said ball races and the ring gear 33 being cut away to receive the opposing ball race.

Suitable bushings are provided for all of the rotating shafts or spindles.

It will be noted that the drills surround the bed plate in the normal position of the bed plate as shown in Figs. 1 and 2 the upper ends of the drills are just slightly below the upper face of the bed plate.

Connected to the bed plate and depending therefrom are a plurality of guide rods 38, which work through openings produced in the base 10 and at their lower ends these rods are provided with nuts or collars 39 to limit the upward movement of the bed plate, and intermediate their ends, they are also provided with stop nuts or collars 40, which contact with the base 10 and limit the downward movement of the bed plate.

In operation the wooden spider is arranged centrally upon the bed plate and the sheet metal flanged felly band is then placed upon said wooden spider, the ends of the wooden spokes contacting with the base portion of the felly band. Fluid pressure is then applied to cylinder 13 forcing down piston 18 and the drill plate 20, until the drill plate comes into contact with the flanged felly band, and the pressure continuing, the band will be forced into firm contact with the spoke ends. While this operation is taking place the drills are rotating in unison, each drill spindle carrying the beveled gear 29, being rotated by the gear 30 upon the shaft 31 which is driven by the gear 32 meshing with the gear 33 carried by the shaft 34 which also carries the gear 35 which is driven by the main or power gear 36 mounted upon the power shaft 37.

By virtue of the greater diameter of the cylinder 13 there will be a preponderance of pressure upon the bed plate and consequently the drill plate will gradually force the bed plate downwardly and as the wheel body is securely clamped between the drill plate and bed plate the spoke ends will first be transversely bored and then the drills will pass through the flanged portion of the felly band thus completing in the operation of the machine the forcing of the felly band upon the wooden spokes and the transverse boring of the spoke and felly band. By reversing the pressure the piston 19 is forced upwardly carrying with it the drill plate and at the same time fluid pressure is applied to the bed plate cylinder which lifts the bed plate. By means of the stop collars 40 upon the guide rods 38 the downward movement of the bed plate will be arrested at the exact moment and by means of the stop collars 39 the upward movement of the bed plate will also be checked thereby maintaining the bed plate in its normal or elevated position ready to receive another spider and band thereon.

It will be noted by reference to Figs. 1 and 2 that large and small sized drills are arranged alternately about the bed plate whereby holes of different diameters are bored, the larger holes being adapted to receive the bolts which carry the demountable tires engaging clamps, while the smaller holes are intended to receive the smaller size bolt or rivet which is intended solely to secure the felly band and spoke end together.

From the foregoing description taken in connection with the drawings, it will be seen that we provide an exceedingly simple and highly efficient machine for simultaneously affixing a metallic felly band to a wooden wheel spider and boring the transverse holes through the spoke ends and felly bands.

By means of the adjustment drill columns various sizes of wheels and bands can be accommodated and if advisable different sizes of bed and drill plates may be employed.

As the means for applying fluid pressure to the various pistons forms no part of the present invention we have not illustrated the same, it being understood that any suitable system may be provided, and it also being understood that either air or water may be employed, and preferably the latter.

It will also be understood that we do not confine ourselves to the exact details of construction herein shown and described but may change or vary the same without departing from the broad principle of the invention as defined in the appended claims.

Having thus described our invention, what we claim is:

1. In a device of the kind described, the combination with a base and frame, of a plurality of drills arranged upon said base, and means for operating said drills in unison, a bed plate arranged within said drills and movable with reference thereto, means for moving said bed plate, a drill plate arranged in said frame, and means for moving said drill plate toward and away from said drills and bed plate.

2. In a device of the kind described, the combination with a base, of a plurality of drills arranged thereon, together with means for operating the same, a cylinder arranged within said drills, and supported upon said base, a bed plate arranged concentric with said drills and provided with a piston working in said cylinder, a drill plate above said bed plate, and fluid actuated means for raising and lowering said drill plate and bed plate.

3. In a device of the kind described, the combination with a base, of a bed plate cylinder arranged thereon, a bed plate having a piston working in said cylinder, a drill plate arranged above the bed plate, a cylinder and piston for raising said drill plate, a cylinder and piston for lowering said drill plate and also forcing down the bed plate, and a plurality of drills arranged upon the base and about the bed plate together with means for actuating said drills.

4. In a device of the kind described, the combination with a base, of a bed plate cylinder arranged thereon, a fluid actuated piston arranged therein, a bed plate carried by said piston, a plurality of drill columns, adjustably mounted upon said base, spindles arranged therein and carrying drills together with means for actuating said drills, a drill plate and fluid actuated pistons connected with said drill plate for moving the same up and down.

5. In a device of the kind described, the combination, with a plurality of drills and means for rotating the same, of a bed plate movable with reference to said drills, a drill plate movable also with reference to the drills, the downward movement of said drill plate effecting the downward movement of the bed plate.

6. In a device of the kind described, the combination with a series of drills, of a bed plate centrally disposed with reference to said drills, a drill plate coacting with the bed plate, means for forcing down the drill and bed plates, and means for returning said drill and bed plates to their normal positions.

7. In a device of the kind described, the combination with a series of drills, of a bed plate centrally disposed with reference to said drills and means for moving said bed plate with reference to said drills, a drill plate above the bed plate and means for moving the same, said movement of the drill plate effecting the movement of the bed plate.

8. In a device of the kind described the combination, with a base, of a plurality of drills arranged thereon and operating in unison, a centrally disposed bed plate arranged within said drills and movable with reference thereto, a drill plate above the bed plate, and means for supporting and moving the same.

9. In a machine of the kind described, a support, a plurality of drills equally spaced about a common center on said support, a centrally disposed work support and means for moving one of said supports toward and from the other support.

10. In a device of the kind described, the combination with a plurality of stationary drills, of a vertically movable bed plate arranged within said drills, a vertically movable drill plate arranged above the bed plate and movable toward and away from said bed plate, the downward movement of said drill plate effecting the downward movement of said bed plate, within the drills.

In testimony whereof, we hereunto affix our signatures.

W. R. EDWARDS.
H. W. KRANZ.